United States Patent
Zhang et al.

(10) Patent No.: US 7,533,896 B2
(45) Date of Patent: May 19, 2009

(54) LOCKING DEVICE OF EXTENDABLE AND RETRACTABLE CONTAINER SEMI-TRAILERS

(75) Inventors: Yongyou Zhang, Guangdong (CN); Zhuoan Wu, Guangdong (CN); Liangfu Xie, Guangdong (CN); Xiya Li, Guangdong (CN)

(73) Assignee: CIMC Vehicles Group Co., Ltd., Guangdong (CN)

( * ) Notice: Subject to any disclaimer, the term of this patent is extended or adjusted under 35 U.S.C. 154(b) by 535 days.

(21) Appl. No.: 11/451,389

(22) Filed: Jun. 13, 2006

(65) Prior Publication Data

US 2007/0024061 A1    Feb. 1, 2007

(30) Foreign Application Priority Data

Jun. 17, 2005   (CN)   ............... 2005 2 0111569 U

(51) Int. Cl.
*B60D 1/54* (2006.01)
(52) U.S. Cl. ............. 280/491.1; 280/656; 280/149.2; 280/482
(58) Field of Classification Search ........... 280/491.1, 280/475, 482, 407.1, 149.2, 656; 180/209
See application file for complete search history.

(56) References Cited

U.S. PATENT DOCUMENTS

| | | | | |
|---|---|---|---|---|
| 3,365,211 A | * | 1/1968 | Ginsburg | 280/81.1 |
| 4,635,742 A | * | 1/1987 | Bertolini | 180/209 |
| 4,993,737 A | * | 2/1991 | Torcomian | 280/407 |
| 5,199,732 A | * | 4/1993 | Lands et al. | 280/407.1 |
| 5,295,703 A | * | 3/1994 | White | 280/414.1 |
| 5,465,990 A | * | 11/1995 | Wessels | 280/407.1 |
| 5,480,171 A | * | 1/1996 | Cheffey | 280/149.2 |
| 5,564,725 A | * | 10/1996 | Brazeal | 280/149.2 |
| 5,564,727 A | * | 10/1996 | Wessels | 280/407.1 |
| 5,620,195 A | * | 4/1997 | Wessels | 280/149.2 |
| 5,642,896 A | * | 7/1997 | Pierce et al. | 280/149.2 |
| 5,758,890 A | * | 6/1998 | Wessels | 280/149.2 |
| 6,279,933 B1 | * | 8/2001 | Ross et al. | 280/149.2 |
| 6,435,536 B2 | * | 8/2002 | Eckelberry | 280/407.1 |
| 7,163,220 B2 | * | 1/2007 | Pappas | 280/149.2 |

* cited by examiner

*Primary Examiner*—Paul N Dickson
*Assistant Examiner*—Tashiana Adams
(74) *Attorney, Agent, or Firm*—Rosenberg, Klein & Lee

(57) ABSTRACT

A locking device of extendable and retractable container semi-trailers comprises four link bars, two lock pin assemblies, a crossmember, a falling tube and a pull assembly. Two ends of the pull assembly are connected with two link bars and one lock pin assembly respectively. Said pull assembly comprises an automatic locking and releasing device fixed rotatablely between a bottom plate and a top plate of said crossmember. The pull assembly is rotated round the automatic locking and releasing device to a locking place, and the automatic locking and releasing device locks said pull assembly. The falling tube acts on the automatic locking and releasing device, and the pull assembly is released.

18 Claims, 4 Drawing Sheets

LOCKING DEVICE OF EXTENDABLE AND RETRACTABLE CONTAINER SEMI-TRAILERS

BACKGROUND OF THE INVENTION

1. Field of the Invention

The present invention relates to a locking device of extendable and retractable container semi-trailers, and 40/45' extendable and retractable container semi-trailers can extend, retract and lock automatically in the course of exchanging container semi-trailers, in particular to a locking device for preventing to damage operating handle and preventing somebody else except owner to operate the container semi-trailer.

2. Description of the Prior Art

In the current operating mechanism of 40/45' extendable and retractable container semi-trailers, the operating handle is controlled manually by operator or bumped to fall down by an inclined wedge of a girder of a rear carriage. The operating handle is fixed under the carriage, so it is impossible to avoid damaging the operating handle when we stack container semi-trailers. Because the operating handle can not be locked, the container semi-trailer are misoperated easily by somebody else.

FIG. 5 shows an operating mechanism of a conventional 40/45 extendable and retractable container semi-trailer. An operating handle is fixed under a girder and welded to a bottom bracket of a middle girder. So the operating handle is damaged during a fork truck stacks the container semi-trailer.

FIG. 6 shows a view of a conventional operating handle switching automatically during a container semi-trailer extends and retracts. The operating mechanism achieves the release by means of an inclined wedge welded on a girder bumping the operating handle.

FIG. 7 shows a state of a conventional handle being placed, and the operating handle can not be locked.

SUMMARY OF THE INVENTION

The object of the present invention is to provide a locking device for preventing to damage operating handle and preventing somebody else except owner to operate the container semi-trailer.

For achieving the aforementioned object, the present invention brings forward the following technical solution: a locking device of extendable and retractable container semi-trailers comprises at least two link bars, at least two lock pin assemblies, a crossmember, a falling tube and a pull assembly. Two ends of the pull assembly are connected with at least one said link bar and one said lock pin assembly respectively. Said pull assembly comprises an automatic locking and releasing device fixed rotatablely between a bottom plate and a top plate of said crossmember. The pull assembly is rotated round the automatic locking and releasing device to a locking place, and the automatic locking and releasing device locks said pull assembly. The falling tube acts on the automatic locking and releasing device, and the pull assembly is released.

The pull assembly comprises a body, and said automatic locking and releasing device is arranged at one end of the body. Said automatic locking and releasing device comprises an outer pipe being connected with the body, a plurality of openings being opened on said body round the outer pipe, an inner pipe being inserted into the outer pipe, a plurality of lock rods being connected with the inner pipe and being inserted into the openings correspondingly, a bottom bracket being fixed to the bottom plate of the crossmember, a top bracket being fixed with the top plate of the crossmember, a resilient member being sleeved out of the inner pipe.

The elasticity of the resilient member makes the inner pipe to move upwardly, then the inner pipe passes through the top bracket and the bottom bracket and is fixed between the top bracket and the bottom bracket.

The pull assembly is jointed to the crossmember, and the top end of the inner pipe passes through the top bracket and the top plate of the crossmember and is exposed up the crossmember .

The pull assembly is rotated to said locking place, and the lock rods will pass through the bottom bracket and insert into the openings to lock the pull assembly tightly.

The falling tube bumps the top end of the inner pipe exposed up the crossmember, and the inner pipe will move downwardly, and the lock rods will draw back from the openings to lead the pull assembly to be released automatically.

The locking device is fixed between two I-shaped girders, and a lockhole is disposed in the outside of said every I-shaped girder.

Said lock pin assembly includes a lock pin and a compression elastic member, and the lock pin connects with the link bar, and the compression elastic member forces the lock pin to extend outwardly and insert into the lockhole. As the pull assembly is rotated, the lock pin draws back and go out of the lockhole.

The present invention can bring following benefits:

the pull assembly is fixed between the two I-shaped girders of the container semi-trailer, and the lowest surface of the locking device is above the bottom surface of the I-shaped girders, thereby the pull assembly including the operating handle can be protected effectively because of avoiding any damages from fork trucks;

when the container semi-retailer needs to extend or retract, the pull assembly is rotated to the locking place, and the lock rods of the pull assembly will move upwardly because of the elasticity of the resilient member to lock the pull assembly. In the time, the lock pins are in retraction state and stay in the web of the two I-shaped girders;

when the front carriage moves, the falling tube on the standing rear carriage will bump the arched body at the top end of the pull assembly, thereby the lock rods move downwardly, and the pull assembly is released, and the lock pins will extend out and collide with the I-shaped girders till the two lock pins insert into the right place in the two lockholes. The pull assembly and the bottom bracket are fixed together by a container seal to avoid someone else except the owner to operating the container semi-retailer.

DESCRIPTION OF THE PREFERRED EMBODIMENT

Figure 1:
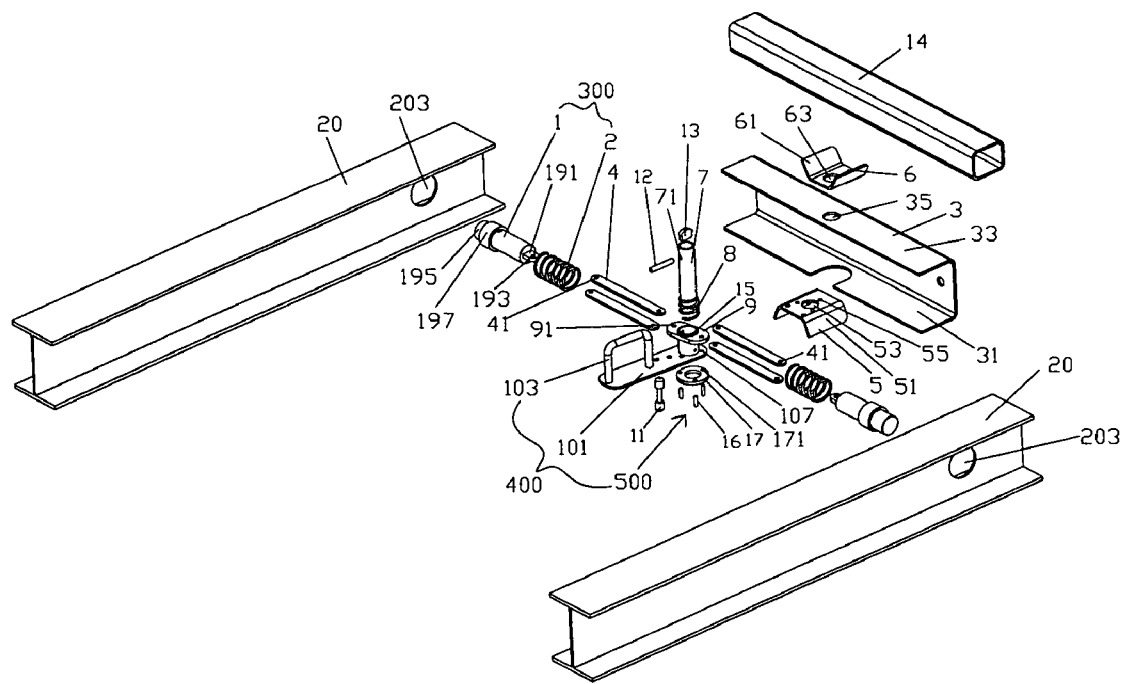
FIG. 1 is a solid explosive view of the present invention.
Figure 2:
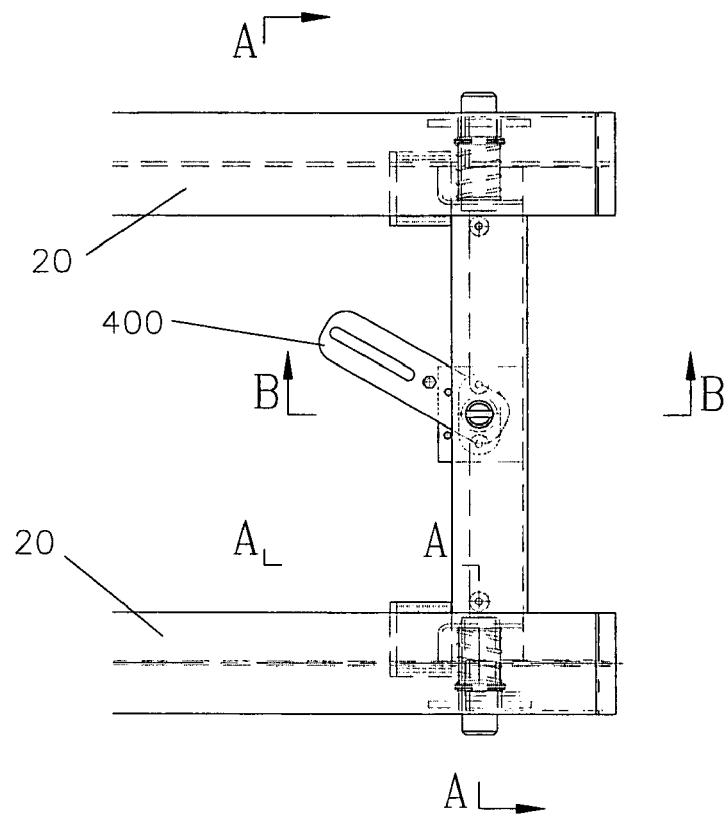
FIG. 2 is a planform view of the present invention.
Figure 3:
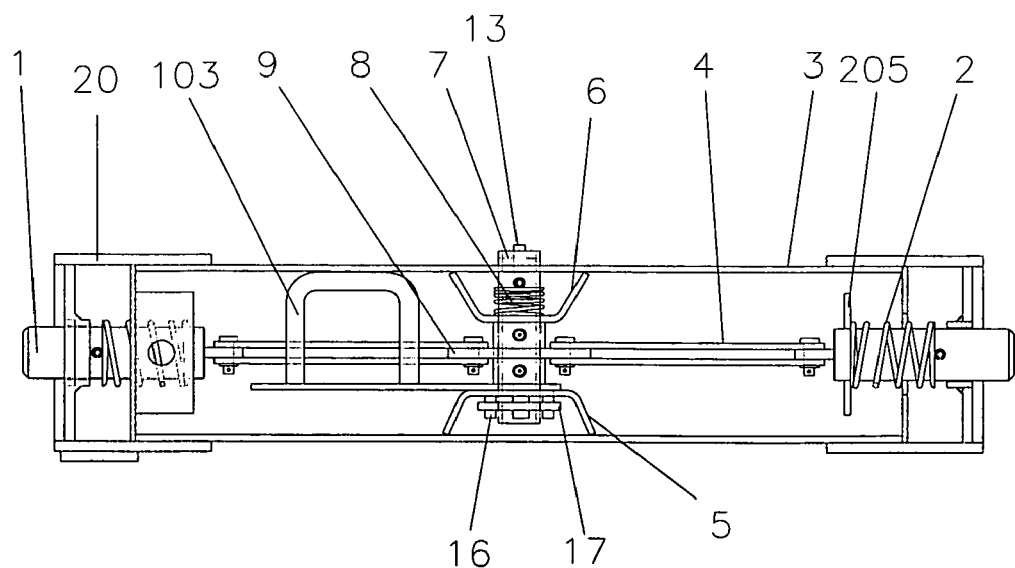
FIG. 3 is a cutaway view of FIG. 2 in the direction of A-A.
Figure 4:
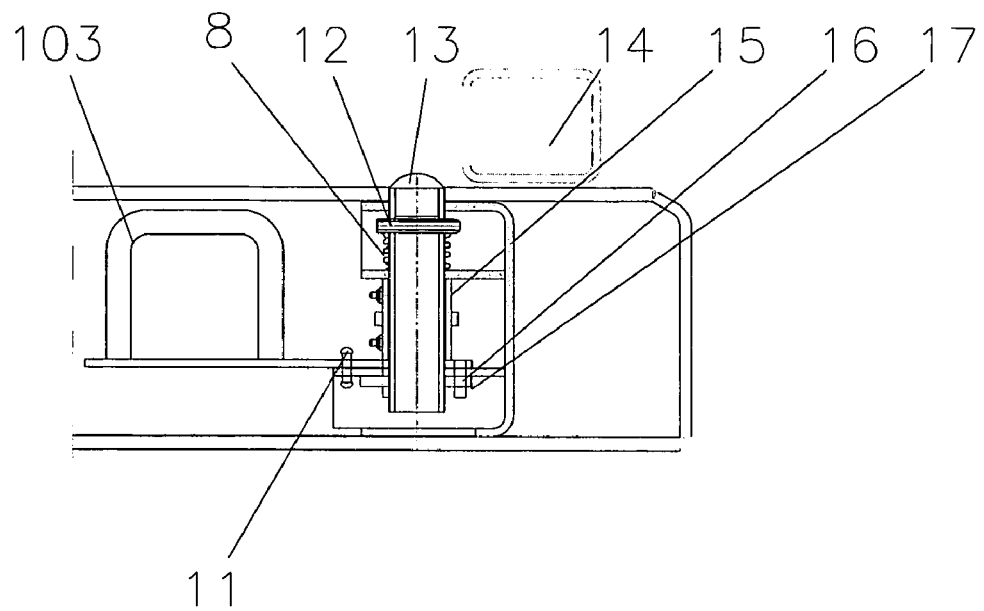
FIG. 4 is a cutaway view of FIG. 2 in the direction of B-B.
Figure 5:
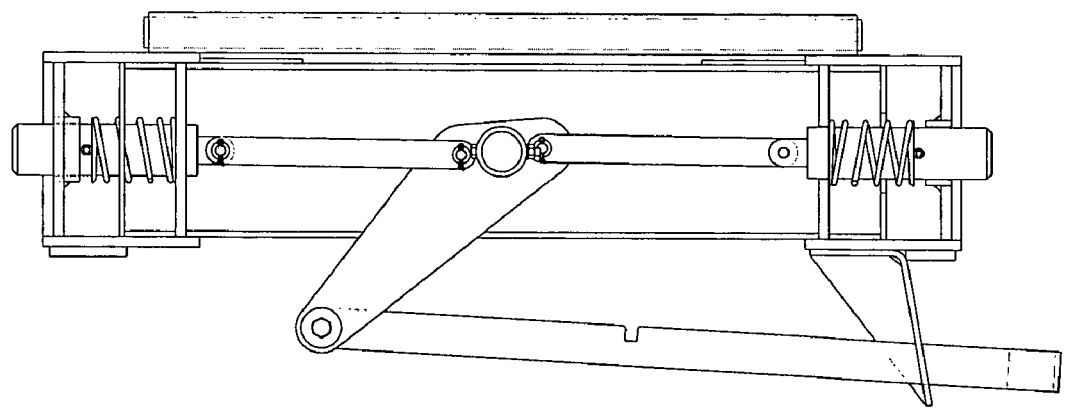
FIG. 5 is an elevation view of a conventional controlling mechanism of a 40/45' extendable and retractable container semi-trailer.
Figure 6:
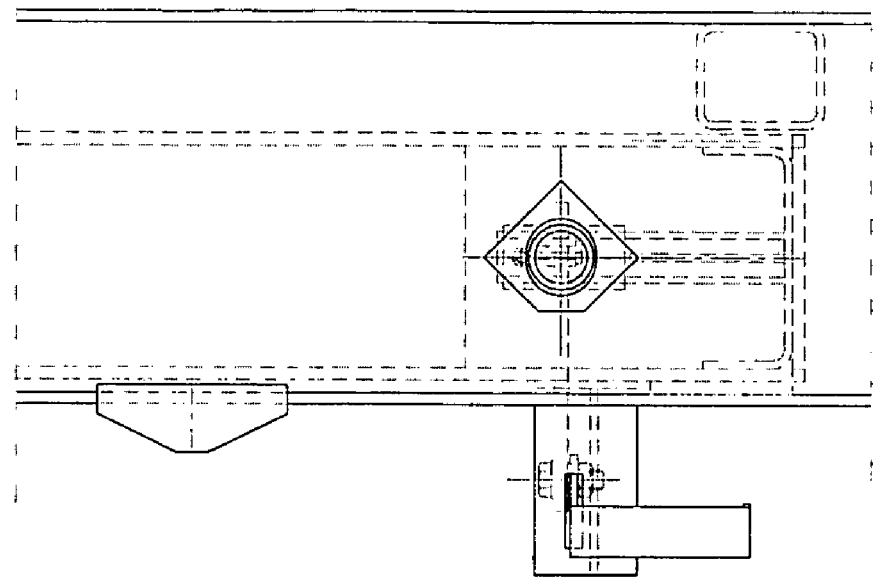
FIG. 6 is a view of a conventional operating handle switching automatically during a container semi-trailer extends and retracts.
Figure 7:
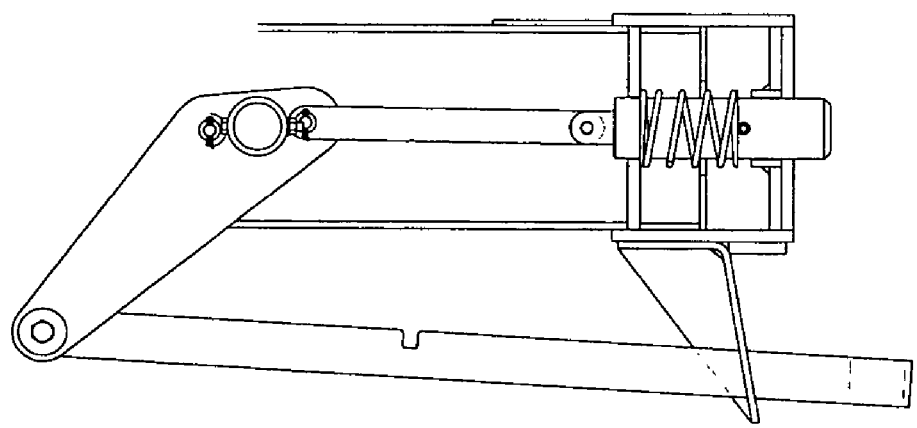
FIG. 7 shows a state of a conventional handle being placed.

As shown in FIG. 1 to FIG. 4, a locking device of extendable and retractable container semi-trailers includes four link bars 4, two lock pin assemblies 300, a crossmember 3, a falling tube 14 and a pull assembly 400.

The locking device is fixed between two I-shaped girders 20. A hole 203 is opened on each I-shaped girder 20. Each of the two I-shaped girders 20 has a baffle plate 205. A lockhole (not shown in FIGs.) is disposed in the outside of the every I-shaped girder 20.

The every link bar 4 has a perforation 41 at two ends thereof respectively.

The every lock pin assembly 300 includes a lock pin 1 and a compression coil spring 2. The lock pin 1 connects with two link bars 4. The compression coil spring 2 forces the lock pin 1 to extend outwardly and insert into the lockhole. As the pull assembly 400 is rotated, the lock pin 1 draws back and go out of the lockhole.

The lock pin 1 is columned and one end thereof has a connective body 191. A connective hole 193 is arranged on the connective body 191. The other end of the lock pin 1 comprises a locking portion 195. The locking portion 195 can move through the hole 203 and extend continuously until the locking portion 195 inserts into the lockhole. There is an annular flange 197 on the lock pin 1 near the locking portion 195.

A rivet or a bolt (not shown in FIGs.) is inserted ordinally through one perforation 41 of one link bar 4, the connective hole 193 of one lock pin 1 and one perforation 41 of another link bar 4 and closed. So the rivet or bolt connects the lock pin 1 and one end of the two link bars 4.

The compression coil spring 2 is sleeved out of the lock pin 1 between the flange 197 and the connective body 191. One end of the compression coil spring 2 leans against the flange 197, and the other end leans against the baffle plate 205 (shown in FIG. 3).

The crossmember 3 is fixed between two I-shaped girders 20 and includes a bottom plate 31 and a top plate 33.

The falling tube 14 is rectangular or square. The falling tube 14 is welded on the rear carriage of the semi-trailer (not shown in FIGs) above the pull assembly 400.

Each of the two ends of the pull assembly 400 connects two link bar 4 and one lock pin assembly 300.

The pull assembly 400 includes an automatic locking and releasing device 500, which is rotatablely fixed between the bottom plate 31 and the top plate 33. The pull assembly 400 rotates round the automatic locking and releasing device 500. When the pull assembly 400 is rotated to a locking place, the automatic locking and releasing device 500 will lock the pull assembly 400 stably. When the falling tube 14 acts on the automatic locking and releasing device 500, the pull assembly 400 will be released automatically. These processes will be mentioned detailedly in following paragraphs.

The pull assembly 400 includes a body 101. The automatic locking and releasing device 500 is arranged at one end of the body 101. An, operating handle 103 is set at the other end of the body 101.

The automatic locking and releasing device 500 comprises an outer pipe 15 being connected with the body 101, a plurality of openings 107 being opened on the body 101 round the outer pipe 15, an inner pipe 7 being inserted into the outer pipe 15, a plurality of lock rods 16 being connected with the inner pipe 7 and being inserted into the openings 107 correspondingly, a bottom bracket 5 being fixed with the bottom plate 31 of the crossmember 3, a top bracket 6 being fixed with the top plate 33 of the crossmember 3, a return spring 8 being sleeved out of the inner pipe 7. The elasticity of the return spring 8 makes the inner pipe 7 to move upwardly. The inner pipe 7 passes through the top bracket 6 and the bottom bracket 5 and is fixed between the top bracket 6 and the bottom bracket 5, so that the pull assembly 400 is jointed to the crossmember 3. The top end of the inner pipe 7 passes through the top bracket 6 and the top plate 33 of the crossmember 3 and is exposed up the crossmember 3. When the pull assembly 400 is turned to said locking place, the lock rods 16 will pass through the bottom bracket 5 and insert into the openings 107 to lock the pull assembly 400 tightly. When the falling tube 14 bumps the top end of the inner pipe 7 which is exposed up the crossmember 3, the inner pipe 7 will move downwardly, and the lock rods 16 will draw back from the openings 107 to lead the pull assembly 400 to be released automatically. These processes will be mentioned detailedly in following paragraphs.

The outer pipe 15 is welded on the body 101 and is a hollow tube. The body 101 comprises three said openings 107. The three openings 107 are distributed like an equilateral triangle.

The top end of the outer pipe 15 has a link plate 9. Two ends of the link plate 9 are jointed with the link bar 4 respectively. The link plate 9 is welded on the outer circle wall of the top portion of the outer pipe 15 and is vertical to the body 101. Each of the two ends of the link plate 9 has an attachment hole 91 and is connected with two link bars 4. A rivet or a bolt (not shown in FIGs.) is inserted ordinally through one perforation 41 of a link bar 4, an attachment hole 91 of the link plate 9 and one perforation 41 of another link bar 4 and closed. The rivet or screw connects the link plate 9 and the other end of the two link bars 4.

The lock pin 1, the link bars 4 and the link plate 9 are jointed by means of riveting or screwing. The link plate 9, the outer pipe 15 and the pull assembly 400 are integrated by means of welding, so the lock pin 1 can extend outwardly or retract inwardly by rotating the operating handle 103 in different directions.

The inner pipe 7 is inserted in the outer pipe 15. The top end of the inner pipe 7 has a hole 71. A slotted type spring pin 12 is inserted in the hole 71.

The return spring 8 is sleeved on the inner pipe 7.

A connecting plate 17 is welded at the bottom end of the inner pipe 7. Three perforations 171 are opened in the connecting plate 17. The lock rods 16 are welded to the middle portion of these perforations 171. When the operating handle 103 is turned a certain degrees in angle, the three openings 107 of the pull assembly 400 will aim at the three perforations 171 exactly.

An arched body 13 is welded at the top end of the inner pipe 7. The arched body 13 is spherical or an arched sheet which is vertical to the falling tube 14.

The bottom bracket 5 is ⌒ shaped by bending two ends of a metal sheet in same direction respectively. The bottom bracket 5 comprises two supporting tabs 51, which are welded on the bottom plate 31 of the crossmember 3. A through hole 53 is opened at the center of the top surface of the bottom bracket 5 for the inner pipe 7 passing through. Three mating holes 55 are disposed on the bottom bracket 5 round the through hole 53 corresponding to the three lock rods 16. In assembly, as the lock rods 16 are inserted into the mating holes 55, the pull assembly 400 is turned to said locking place, and the mating holes 55 aim at those openings 107, and the lock rods 16 are inserted into the openings 107 to lock the pull assembly 400 stably.

The top bracket 6 also is ⌣ shaped by bending two ends of a metal sheet in same direction respectively. The top bracket 6 comprises two supporting tabs 61, which are welded on the top plate 33 of the crossmember 3. A through hole 63 is opened at the center of the bottom surface of the top bracket 6.

A through hole 35 is opened on the top plate 33 of the crossmember 3 for the arched body 13 passing through and extending out.

In assembly, the link plate 9, the outer pipe 15 and the pull assembly 400 are welded together firstly, then the inner pipe 7, the three lock rods 16 and the connecting plate 17 are welded. The bottom bracket 5 is sleeved out of the inner pipe 7 from its top end. The three lock pins 16 are inserted into the three mating holes 55 respectively, and the connecting plate 17 is under the bottom bracket 5. The inner pipe 7 is sleeved out of the outer pipe 15 from its bottom end, then the top bracket 6 is sleeved out of the inner pipe 7 from its top end. The return spring 8 is sleeved out of the inner pipe 7, and the slotted type spring pin 12 is fixed to the inner pipe 7 to press the return spring 8. So one end of the return spring 8 presses the slotted type spring pin 12 at the top end of the inner pipe 7, the other end presses the top bracket 6. Then the arched body 13 is welded at the top end of the inner pipe 7. Finally, the bottom bracket 5 and the top bracket 6 are welded on the bottom plate 31 and the top plate 33 of the crossmember 3 respectively. The arched body 13 protrudes from the through hole 35 because of the elasticity of the return spring 8. The link bars 4 are connected with the link plate 9 by means of screwing or riveting. The compression coil spring 2 is sleeved out of the lock pin 1. The lock pins 1 are jointed with the link bars 4 by screwing or riveting, and the lock pin 1 passes through the hole 203.

For exchanging container semi-trailers, the operating handle 103 is rotated firstly, then the link plate 9 drives the link bar 4 to rotate to lead the lock pins 1 to draw back until the lock pins 1 is placed in the web of the I-shaped girders 20. When the operating handle 103 is turned to said locking place, the three openings 107 of the pull assembly 400 will aim at the three mating holes 55 of the bottom bracket 5, and the three lock rods 16 will move upwardly and insert into the three corresponding openings 107 because of the elasticity of the return spring 8. Because the three lock rods 16 are inserted in the mating holes 55 of the bottom bracket 5 and the three openings 107 of the pull assembly 400, the pull assembly 400 is locked stably.

While the container semi-trailer extends and retracts, the arched body 13 moves upwardly to be exposed up the top plate 33 of the crossmember 3 because of the elasticity of the return spring 8. The falling tube 14 drops from the rear carriage of the container semi-trailer and bumps the arched body 13 to force the inner pipe 7 to move downwardly, so the three lock rods 16 also move downwardly. So the lock rods 16 draw back from the three openings 107 of the pull assembly 400, then the pull assembly 400 is released from said locking place under the action of the compression coil spring 2. Furthermore, the lock pins 1 touch the web of the I-shaped girder and enter the lockhole (not shown in FIGs) automatically when the lock pins 1 extend at the right place. After finishing exchange container semi-trailers, a container seal 11 is fixed in a hole (not marked in FIGs) on the body 101 to keep the pull assembly 400 in a locking state to prevent someone else except the owner to operate the container semi-trailer. Before exchanging the container semi-trailer again, the container seal 11 must be destroyed.

We claim:

1. A locking device of extendable and retractable container semi-trailers comprising: at least two link bars; at least two lock pin assemblies; a crossmember; a falling tube; and a pull assembly;

two ends of said pull assembly being connected with at least one said link bar and one said lock pin assembly respectively; said pull assembly comprising an automatic locking and releasing device fixed rotatably between a bottom plate and a top plate of said crossmember; said pull assembly being rotated round said automatic locking and releasing device to a locking place, and said automatic locking and releasing device locking said pull assembly; and said falling tube acting on said automatic locking and releasing device, and said pull assembly being release; said pull assembly further including a body, and said automatic locking and releasing device being arranged at one end of said body; said automatic locking and releasing device including an outer pipe connected with said body, a plurality of openings being opened on said body around the outer pipe, an inner pipe being inserted into said outer pipe, a plurality of lock rods being connected with said inner pipe and being respectively inserted into said openings, a bottom bracket being fixed to said bottom plate of said crossmember, a top bracket being fixed with said top plate of said crossmember, a resilient member being sleeved out of said inner pipe; wherein elasticity of said resilient member makes the inner pipe move upwardly, then said inner pipe passes through said top bracket and said bottom bracket and is fixed between said top bracket and said bottom bracket; said pull assembly being jointed to said crossmember, and a top end of the inner pipe passes through said top bracket and said top plate of said crossmember and is exposed above the crossmember; and said pull assembly being rotated to said locking place, and said lock rods will pass through said bottom bracket and insert into said openings to lock said pull assembly tightly; and responsive to said falling tube bumping said top end of said inner pipe exposed above said crossmember, said inner pipe moves downwardly and said lock rods draw back from said openings to release said pull assembly.

2. A locking device of extendable and retractable container semi-trailers according to claim 1, wherein one end of the resilient member presses the top end of the inner pipe, and the other end presses the top bracket.

3. A locking device of extendable and retractable container semi-trailers according to claim 2, wherein a slurred type spring pin is fixed to the top end of the inner pipe, and the resilient member presses the slotted type spring pin.

4. A locking device of extendable and retractable container semi-trailers according to claim 1, wherein a plurality of mating hole are disposed on the bottom bracket corresponding to said lock rods; as the lock rods are inserted into the mating holes, the pull assembly is turned to said locking place, and the mating holes aim at those openings, and the lock rods are inserted into the openings to lock the pull assembly stably.

5. A locking device of extendable and retractable container semi-trailers according to claim 1, wherein a connecting plate is connected at the bottom end of the inner pipe, and said lock rods are fixed in the connecting plate.

6. A locking device of extendable and retractable container semi-trailers according to claim 5, wherein a plurality of perforations are opened in the connecting plate, and the lock rods are welded in these perforations.

7. A locking device of extendable and retractable container semi-trailers according to claim 1, wherein an arched body is connected at the top end of the inner pipe, and the falling tube bumps the arched body.

8. A locking device of extendable and retractable container semi-trailers according to claim 7, wherein said arched body is spherical or an arched sheet which is vertical to the falling tube.

9. A locking device of extendable and retractable container semi-trailers according to claim 1, wherein a through hole is opened on the top plate of the crossmember for the inner pipe passing through and extending out.

10. A locking device of extendable and retractable container semi-trailers according to claim 1, wherein a through hole is opened at the center of the bottom bracket for the inner pipe passing through, and a through hole is opened at the center of the top bracket for the inner pipe passing through, and the mating holes are disposed on the bottom bracket round the through hole.

11. A locking device of extendable and retractable container semi-trailers according to claim 10, wherein the top bracket is ⌒shaped by bending two ends of a metal sheet in same direction respectively and comprises two supporting tabs, which are welded on the top plate of the crossmember, and said through hole is opened at the center of the bottom surface of the top bracket.

12. A locking device of extendable and retractable container semi-trailers according to claim 10, wherein the bottom bracket is ⌣shaped by bending two ends of a metal sheet in same direction respectively and comprises two supporting tabs, which are welded on the top plate of the crossmember, and said through hole is opened at the center of the bottom surface of the top bracket.

13. A locking device of extendable and retractable container semi-trailers according to claim 1, wherein the top end of the outer pipe has a link plate, and two ends of the link plate are jointed with at least one said link bar respectively.

14. A locking device of extendable and retractable container semi-trailers according to claim 1, wherein an operating handle is set at the other end of the body.

15. A locking device of extendable and retractable container semi-trailers according to claim 1, wherein the falling tube is rectangular or square.

16. A locking device of extendable and retractable container semi-trailers according to claim 1, wherein a container seal is fixed in a hole on the body to keep the pull assembly in a locking state.

17. A locking device of extendable and retractable container semi-trailers according to claim 1, wherein the locking device is fixed between two I-shaped girders, and a lockhole is disposed in the outside of said every I-shaped girder.

18. A locking device of extendable and retractable container semi-trailers according to claim 17, wherein said lock pin assembly includes a lock pin and a compression elastic member, and the lock pin connects with the link bar, and the compression elastic member forces the lock pin to extend outwardly and insert into the lockhole; as the pull assembly is rotated, the lock pin draws back and go out of the lockhole.

* * * * *